United States Patent
Jia et al.

(10) Patent No.: US 9,571,859 B2
(45) Date of Patent: Feb. 14, 2017

(54) INTRAFRAME CODING METHOD, DEVICE AND ENCODER FOR DEPTH IMAGES

(75) Inventors: Jie Jia, Beijing (CN); Hongbin Liu, Beijing (CN)

(73) Assignee: LG ELECTRONICS (CHINA) R & D CENTER CO, LTD., Beijing (CN)

( * ) Notice: Subject to any disclaimer, the term of this patent is extended or adjusted under 35 U.S.C. 154(b) by 215 days.

(21) Appl. No.: 14/412,644

(22) PCT Filed: Aug. 14, 2012

(86) PCT No.: PCT/CN2012/080103
§ 371 (c)(1),
(2), (4) Date: Apr. 20, 2015

(87) PCT Pub. No.: WO2014/005367
PCT Pub. Date: Jan. 9, 2014

(65) Prior Publication Data
US 2015/0304683 A1      Oct. 22, 2015

(30) Foreign Application Priority Data
Jul. 3, 2012   (CN) .......................... 2012 1 0229360

(51) Int. Cl.
*H04N 19/00*    (2014.01)
*H04N 19/597*   (2014.01)
(Continued)

(52) U.S. Cl.
CPC ............ *H04N 19/597* (2014.11); *H04N 19/11* (2014.11); *H04N 19/147* (2014.11);
(Continued)

(58) Field of Classification Search
CPC .... H04N 19/597; H04N 19/11; H04N 19/147; H04N 19/593
(Continued)

(56) References Cited

U.S. PATENT DOCUMENTS

| 2012/0033737 A1 | 2/2012 | Sato | |
|---|---|---|---|
| 2012/0229602 A1* | 9/2012 | Chen | .................... H04N 19/597 348/43 |
| 2013/0266074 A1* | 10/2013 | Guo | ................. H04N 19/00969 375/240.24 |

FOREIGN PATENT DOCUMENTS

| CN | 102045560 | 5/2011 |
|---|---|---|
| CN | 102396232 | 3/2012 |

(Continued)

OTHER PUBLICATIONS

International Searching Authority, "Written Opinion & International Preliminary Report on Patentability", issued in connection with International Patent Application No. PCT/CN2012/080103, dated Oct. 25, 2012 (17 pages).

(Continued)

*Primary Examiner* — Jeffery Williams
(74) *Attorney, Agent, or Firm* — Hanley Flight & Zimmerman, LLC

(57) ABSTRACT

The embodiments of the present invention provide an intraframe encoding method, device and encoder for depth images. The method is applied to 3D video encoding or multi-view video encoding. The method includes: in an intraframe encoding mode for depth images, generating a non-all-zero residual and an all-zero residual when a prediction unit is encoded; and performing a rate-distortion optimization selection between the non-all-zero residual and the all-zero residual, as a residual encoding scheme of the prediction unit. The device is applied to 3D video encoding or multi-view video encoding. The device includes: a residual generation unit configured to generate, in an intraframe encoding mode for depth images, a non-all-zero residual and an all-zero residual when a prediction unit is encoded; and a rate-distortion optimization selection unit configured to perform a rate-distortion optimization selec- (Continued)

101 — In an intraframe encoding mode for depth images, generating a non-all-zero residual and an all-zero residual when a prediction unit is encoded 102 — Performing a rate-distortion optimization selection between the non-all-zero residual and the all-zero residual, as a residual encoding scheme of the prediction unit tion between the non-all-zero residual and the all-zero residual, as a residual encoding scheme of the prediction unit.

11 Claims, 5 Drawing Sheets

(51) Int. Cl.
    *H04N 19/147*     (2014.01)
    *H04N 19/11*     (2014.01)
    *H04N 19/172*     (2014.01)
    *H04N 19/65*     (2014.01)
    *H04N 19/593*     (2014.01)

(52) U.S. Cl.
    CPC ........... *H04N 19/172* (2014.11); *H04N 19/65* (2014.11); *H04N 19/593* (2014.11)

(58) Field of Classification Search
    USPC ..................................................... 375/240.12
    See application file for complete search history.

(56) References Cited

FOREIGN PATENT DOCUMENTS

| | | |
|---|---|---|
| CN | 102420990 | 4/2012 |
| CN | 102438167 | 5/2012 |
| EP | 2493197 | 8/2012 |
| WO | 2011031332 | 3/2011 |

OTHER PUBLICATIONS

The State Intellectual Property Office of China, "First Office Action", issued in connection with Chinese Patent Application No. 201210229360, dated Jul. 5, 2016 (10 pages).

* cited by examiner

INTRAFRAME CODING METHOD, DEVICE AND ENCODER FOR DEPTH IMAGES

The present application claims priority to Chinese Patent Application No. 201210229360.X, entitled "Intraframe Encoding Method, Device and Encoder for Depth Images", and filed on Jul. 3, 2012 before the State Intellectual Property Office of P.R.C., which is hereby incorporated by reference in its entirety.

TECHNICAL FIELD

The disclosure relates to the field of video encoding and decoding technologies, and particularly, to an intraframe encoding method, device and encoder for depth images.

BACKGROUND

In the 3D video encoding or multi-view application, depth images may be used to provide a more flexible viewing angle. The depth information is different from the texture information, i.e., it is not directly used for a display, but converted into a disparity vector and then used for generating a synthetic viewpoint together with the texture information.

During the generation of the synthetic viewpoint, the distortion of the depth block has very little influence on the distortion of the synthetic viewpoint under the following two conditions: 1. the distortion of the depth value does not cause the distortion of the disparity vector; and 2. the vicinity area of the texture value corresponding to the current depth value is very smooth.

It can be seen that under the above two conditions, the residual of the encoding depth block needs to occupy a code rate without improving the quality of the synthetic viewpoint.

SUMMARY

In one aspect, the embodiments of the present invention provide an intraframe encoding method for depth images, applied to 3D video encoding or multi-view video encoding, including:

in an intraframe encoding mode for depth images, generating a non-all-zero residual and an all-zero residual when a prediction unit is encoded; and performing a rate-distortion optimization selection between the non-all-zero residual and the all-zero residual, as a residual encoding scheme of the prediction unit.

Optionally, in one embodiment of the present invention, the step of performing the rate-distortion optimization selection between the non-all-zero residual and the all-zero residual, as the residual encoding scheme of the prediction unit includes: acquiring a rate-distortion cost corresponding to the non-all-zero residual and a rate-distortion cost corresponding to the all-zero residual, respectively; and selecting one of the non-all-zero residual and the all-zero residual which corresponds to a minimum rate-distortion cost and adopt a residual encoding scheme corresponding to the selected residual as the residual encoding scheme of the prediction unit.

Optionally, in one embodiment of the present invention, the step of acquiring the rate-distortion cost corresponding to the non-all-zero residual and the rate-distortion cost corresponding to the all-zero residual, respectively, includes: calculating a distortion and a code rate corresponding to the non-all-zero residual, and then calculating the rate-distortion cost corresponding to the non-all-zero residual; and calculating a distortion and a code rate corresponding to the all-zero residual, and then calculating the rate-distortion cost corresponding to the all-zero residual.

Optionally, in one embodiment of the present invention, the step of calculating the distortion and the code rate corresponding to the non-all-zero residual includes: calculating the distortion and the code rate corresponding to the non-all-zero residual by performing transformation, quantization, entropy encoding, inverse quantization, and inverse transformation of the non-all-zero residual; and calculating the distortion and the code rate corresponding to the all-zero residual comprises: calculating the distortion and the code rate corresponding to the all-zero residual by performing entropy encoding of the all-zero residual.

Optionally, in one embodiment of the present invention, the step of in the intraframe encoding mode for depth images, generating the non-all-zero residual and the all-zero residual when the prediction unit is encoded includes: in the intraframe encoding mode for depth images, generating the non-all-zero residual when the prediction unit is encoded, and generating the all-zero residual by directly zero-setting a residual in the non-all-zero residual.

In another aspect, the embodiments of the present invention provide an intraframe encoding device for depth images, applied to 3D video encoding or multi-view video encoding, including:

a residual generation unit configured to generate, in an intraframe encoding mode for depth images, a non-all-zero residual and an all-zero residual when a prediction unit is encoded; and a rate-distortion optimization selection unit configured to perform a rate-distortion optimization selection between the non-all-zero residual and the all-zero residual, as a residual encoding scheme of the prediction unit.

Optionally, in one embodiment of the present invention, the rate-distortion optimization selection unit includes: a rate-distortion cost acquisition module configured to acquire a rate-distortion cost corresponding to the non-all-zero residual and a rate-distortion cost corresponding to the all-zero residual, respectively; and a rate-distortion optimization selection module configured to select one of the non-all-zero residual and the all-zero residual which corresponds to a minimum rate-distortion cost and adopt a residual encoding scheme corresponding the selected residual as the residual encoding scheme of the prediction unit.

Optionally, in one embodiment of the present invention, the rate-distortion cost acquisition module includes: a first calculation module configured to calculate a distortion and a code rate corresponding to the non-all-zero residual, and then calculate the rate-distortion cost corresponding to the non-all-zero residual; and a second calculation module configured to calculate a distortion and a code rate corresponding to the all-zero residual, and then calculating the rate-distortion cost corresponding to the all-zero residual.

Optionally, in one embodiment of the present invention, the first calculation module is further configured to calculate the distortion and the code rate corresponding to the non-all-zero residual by performing transformation, quantization, entropy encoding, inverse quantization, and inverse transformation on the non-all-zero residual; and the second calculation module is further configured to calculate the distortion and the code rate corresponding to the all-zero residual by performing entropy encoding on the all-zero residual.

Optionally, in one embodiment of the present invention, the residual generation unit is further configured to generate, in the intraframe encoding mode for depth images, the non-all-zero residual when the prediction unit is encoded, and generate the all-zero residual by directly zero-setting a residual in the non-all-zero residual.

In still another aspect, the embodiments of the present invention provide an encoder, applied to 3D video encoding or multi-view video encoding, including the above intraframe encoding device for depth images.

BRIEF DESCRIPTION OF THE DRAWINGS

In order to more clearly describe the technical solutions in the prior art or the embodiments of the present invention, the drawings to be used in the descriptions of the prior art or the embodiments will be briefly introduced as follows. Obviously, the following drawings just illustrate some embodiments of the present invention, and a person ordinarily skilled in the art can obtain other drawings from them without paying any creative effort.

DETAILED DESCRIPTION OF THE EMBODIMENTS

The technical solutions of the embodiments of the present invention will be clearly and completely described as follows with reference to the drawings. Obviously, those described embodiments described herein are just parts of the embodiments of the present invention rather than all the embodiments. Based on the embodiments of the present invention, any other embodiment obtained by a person ordinarily skilled in the art without paying any creative effort shall fall within the protection scope of the present invention.

In order to solve the problem, the embodiments of the present invention propose that a residual of depth images may not be encoded in the intraframe encoding mode for depth images, and the encoder may determine whether or not to encode the residual through a rate-distortion optimization selection between the non-all-zero residual and the all-zero residual.

The embodiments of the present invention provide an intraframe encoding method, device and encoder for depth images, so as to reduce the code rate required for encoding depth images, and improve the encoding performance.

Figure 1:
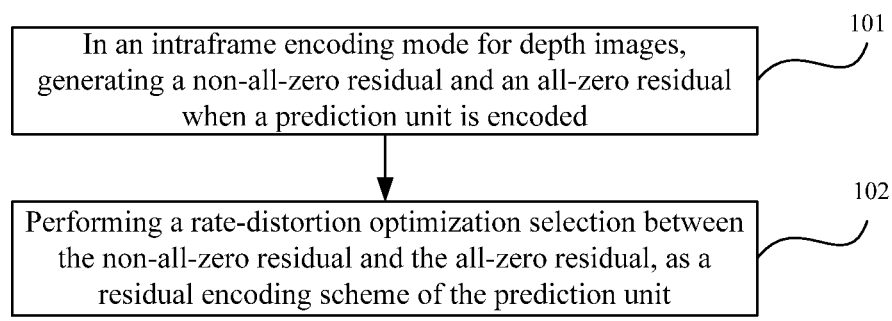
FIG. 1 is a flowchart of an intraframe encoding method for depth images according to an embodiment of the present invention.

FIG. 1 is a flowchart of an intraframe encoding method for depth images according to an embodiment of the present invention. The intraframe encoding method for depth images is applied to 3D video encoding or multi-view video encoding, and includes:

101: in an intraframe encoding mode for depth images, generating a non-all-zero residual and an all-zero residual when a prediction unit is encoded;

102: performing a rate-distortion optimization selection between the non-all-zero residual and the all-zero residual, as a residual encoding scheme of the prediction unit.

The above technical solutions have the following beneficial effect. The method, applied to 3D video encoding or multi-view video encoding, includes: in an intraframe encoding mode for depth images, generating a non-all-zero residual and an all-zero residual when a prediction unit is encoded; and selecting a rate-distortion optimization between the non-all-zero residual and the all-zero residual, as a residual encoding scheme of the prediction unit. Since the above technical means are employed, the code rate required for encoding depth images is reduced, the encoding performance is improved, the video compression encoding and decoding efficiency is increased, and the structure of the existing image unit is not destroyed while the encoding and decoding efficiency is increased, which facilitates implementation of the hardware.

Optionally, the step of performing the rate-distortion optimization selection between the non-all-zero residual and the all-zero residual, as the residual encoding scheme of the prediction unit includes: acquiring a rate-distortion cost corresponding to the non-all-zero residual and a rate-distortion cost corresponding to the all-zero residual, respectively; and selecting one of the non-all-zero residual and the all-zero residual which corresponds to a minimum rate-distortion cost and adopting a residual encoding scheme corresponding to the selected residual as the residual encoding scheme of the prediction unit.

Optionally, the step of acquiring the rate-distortion cost corresponding to the all-zero residual and the rate-distortion cost corresponding to the non-all-zero residual, respectively, includes: calculating a distortion and a code rate corresponding to the non-all-zero residual, and then calculating the rate-distortion cost corresponding to the non-all-zero residual; calculating a distortion and a code rate corresponding to the all-zero residual, and then calculating the rate-distortion cost corresponding to the all-zero residual.

Optionally, the step of calculating the distortion and the code rate corresponding to the non-all-zero residual includes: calculating the distortion and the code rate corresponding to the non-all-zero residual by performing transformation, quantization, entropy encoding, inverse quantization, and inverse transformation on the non-all-zero residual; and the step of calculating the distortion and the code rate corresponding to the all-zero residual includes: calculating the distortion and the code rate corresponding to the all-zero residual by performing entropy encoding on the all-zero residual.

Optionally, the step of in the intraframe encoding mode for depth images, generating the non-all-zero residual and the all-zero residual when the prediction unit is encoded includes: in the intraframe encoding mode for depth images, generating the non-all-zero residual when the prediction unit is encoded, and generating the all-zero residual by directly zero-setting residual(s) of the non-all-zero residual.

The technical solution of the above method according to the embodiment of the present invention has the following beneficial effect. The method, applied to 3D video encoding or multi-view video encoding, includes: in an intraframe encoding mode for depth images, generating a non-all-zero residual and an all-zero residual when a prediction unit is encoded; and performing a rate-distortion optimization selection between the non-all-zero residual and the all-zero residual, as a residual encoding scheme of the prediction unit. Since the above technical means are employed, the code rate required for encoding depth images is reduced, the encoding performance is improved, the video compression encoding and decoding efficiency is increased, and the structure of the existing image unit is not destroyed while the encoding and decoding efficiency is increased, which facilitates implementation of the hardware.

Figure 2:
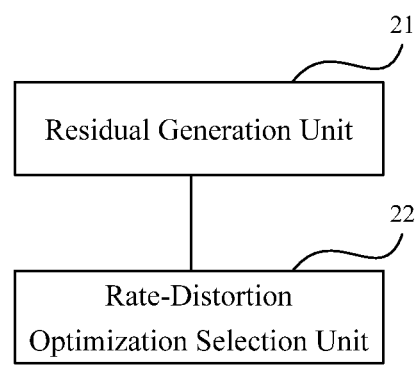
FIG. 2 is a structural schematic diagram of an intraframe encoding device for depth images according to an embodiment of the present invention.

In correspondence to the above method according to the embodiment of the present invention, FIG. 2 is a structural schematic diagram of an intraframe encoding device for depth images according to an embodiment of the present invention. The intraframe encoding device for depth images is applied to 3D video encoding or multi-view video encoding, and includes:

a residual generation unit 21 configured to generate, in an intraframe encoding mode for depth images, a non-all-zero residual and an all-zero residual when a prediction unit is encoded; and a rate-distortion optimization selection unit 22 configured to perform a rate-distortion optimization selection between the non-all-zero residual and the all-zero residual, as a residual encoding scheme of the prediction unit.

Figure 3:
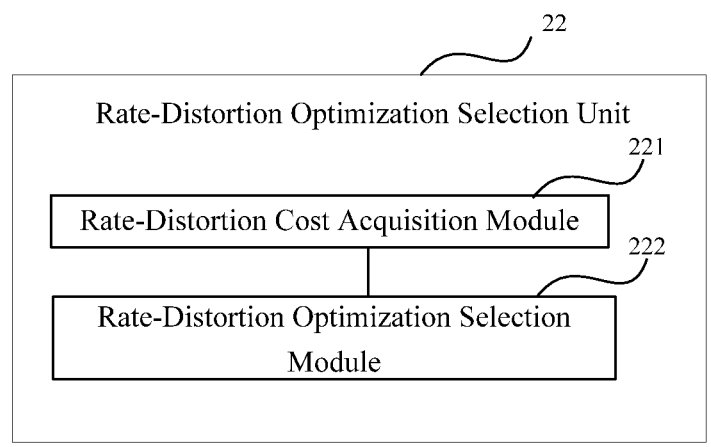
FIG. 3 is a structural schematic diagram of a rate-distortion optimization selection unit according to an embodiment of the present invention.

Optionally, FIG. 3 is a structural schematic diagram of a rate-distortion optimization selection unit according to an embodiment of the present invention. The rate-distortion optimization selection unit 22 includes: a rate-distortion cost acquisition module 221 configured to acquire a rate-distortion cost corresponding to the non-all-zero residual and a rate-distortion cost corresponding to the all-zero residual, respectively; and a rate-distortion optimization selection module 222 configured to select a scheme of one of the non-all-zero residual and the all-zero residual which corresponds to a minimum rate-distortion cost as the residual encoding scheme of the prediction unit.

Figure 4:
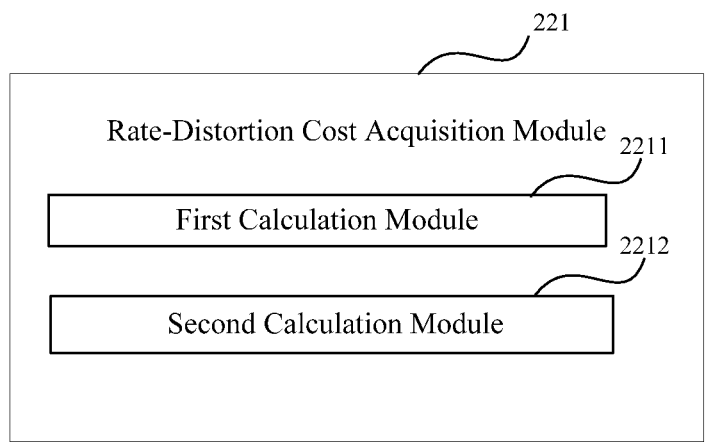
FIG. 4 is a structural schematic diagram of a rate-distortion cost acquisition module according to an embodiment of the present invention.

Optionally, FIG. 4 is a structural schematic diagram of a rate-distortion cost acquisition module according to an embodiment of the present invention. The rate-distortion cost acquisition module 221 includes: a first calculation module 2211 configured to calculate a distortion and a code rate corresponding to the non-all-zero residual, and then calculate the rate-distortion cost corresponding to the non-all-zero residual; and a second calculation module 2212 configured to calculate a distortion and a code rate corresponding to the all-zero residual, and then calculate the rate-distortion cost corresponding to the all-zero residual. Preferably, the first calculation module 2211 is further configured to calculate the distortion and the code rate corresponding to the non-all-zero residual by performing transformation, quantization, entropy encoding, inverse quantization, and inverse transformation on the non-all-zero residual; and the second calculation module 2212 is further configured to calculate the distortion and the code rate corresponding to the all-zero residual by performing entropy encoding on the all-zero residual.

Optionally, in one embodiment of the present invention, the residual generation unit 21 is further configured to generate, in the intraframe encoding mode for depth images, the non-all-zero residual when the prediction unit is encoded, and generate the all-zero residual by directly zero-setting residual(s) of the non-all-zero residual.

In another aspect, the embodiments of the present invention provide an encoder applied to 3D video encoding or multi-view video encoding, and the encoder includes the above intraframe encoding device for depth images.

The technical solutions of the above device and the above encoder according to the embodiments of the present invention have the following beneficial effect. The intraframe encoding device for depth images, applied to 3D video encoding or multi-view video encoding, includes: a residual generation unit configured to generate, in an intraframe encoding mode for depth images, a non-all-zero residual and an all-zero residual when a prediction unit is encoded; and a rate-distortion optimization selection unit configured to perform a rate-distortion optimization selection between the non-all-zero residual and the all-zero residual, as a residual encoding scheme of the prediction unit. Since the above technical means are employed, the code rate required for encoding depth images is reduced, the encoding performance is improved, the video compression encoding and decoding efficiency is increased, and the structure of the existing image unit is not destroyed while the encoding and decoding efficiency is increased, which facilitates implementation of the hardware.

Figure 5:
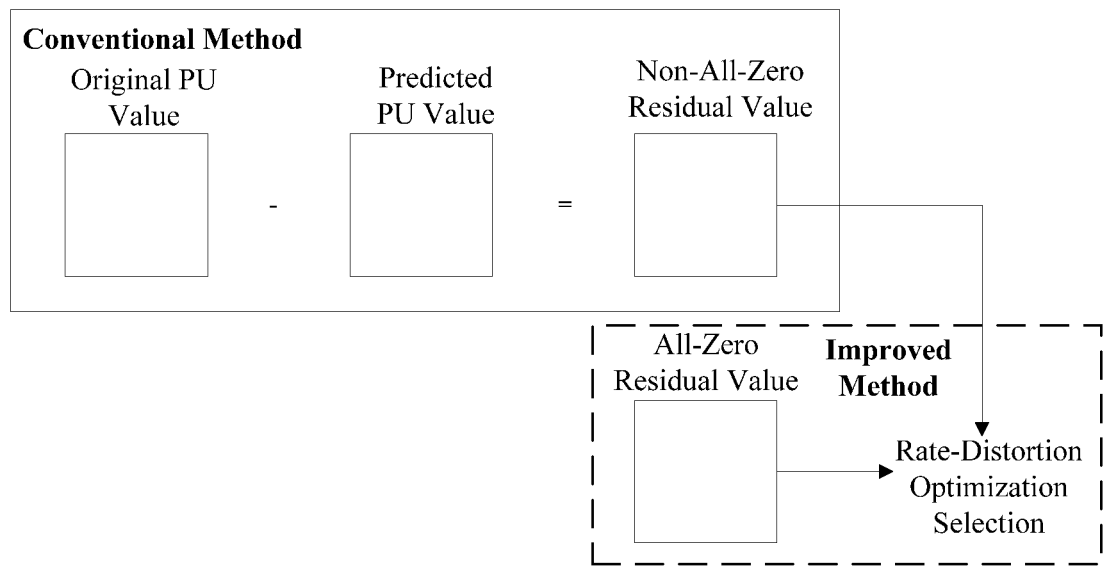
FIG. 5 is a schematic diagram of an intraframe encoding method for depth images based on a rate-distortion optimization selection between a non-all-zero residual and an all-zero residual according to an application example of the present invention.

The technical solution is implemented in the following steps. FIG. 5 is a schematic diagram of an intraframe encoding method for depth images based on a rate-distortion optimization selection between a non-all-zero residual and an all-zero residual according to an application example of the present invention.

The application example of the present invention provides an encoder applied to 3D video encoding or multi-view video encoding, and the encoder includes the above intraframe encoding device for depth images. When an intraframe image encoding is performed for a prediction unit, either of a non-all-zero residual encoding scheme and an all-zero residual encoding scheme may be used, and use of which residual encoding scheme does not need an additional flag bit identification. The non-all-zero residual is obtained using the conventional intraframe encoding method for depth images (the non-all-zero residual value is obtained by subtracting a predicted PU (Prediction unit) value from an original PU value), and the all-zero residual value is obtained by directly zero-setting residual(s) of the non-all-zero residual value. The residual encoding scheme to be used may be determined through a rate-distortion optimization selection. The encoder determines whether a residual shall be encoded through a rate-distortion optimization selection between the residual generated using the conventional method and the all-zero residual.

When a prediction unit is encoded in an intraframe encoding mode for depth images, firstly a non-all-zero residual is generated using the conventional method; then transformation, quantization, entropy encoding, inverse quantization, and inverse transformation are performed on the non-all-zero residual to calculate a distortion and a code rate corresponding to on the non-all-zero residual, and then to calculate a rate-distortion cost. Secondly, entropy encoding is performed on the all-zero residual to calculate a distortion and a code rate corresponding thereto, and then a rate-distortion cost is calculated. Finally, a scheme of one of the non-all-zero residual and the all-zero residual which corresponds to a minimum rate-distortion cost is selected as a final residual encoding scheme.

The application example of the present invention has the following beneficial effect: the technology increases the video compression encoding and decoding efficiency, and the structure of the existing image unit is not destroyed while the encoding and decoding efficiency is increased, which facilitates implementation of the hardware.

The test result of the application example of the present invention is made where the proposed method is integrated into 3DV-HTM (three dimensional video encoding—High Efficiency Video encoding (HEVC) based test model) 3.0 and shows comparison result. Although the method is integrated into the HEVC (high efficiency video encoding) based 3D encoding software, it may also be used in the AVC (advanced video encoding) based 3D encoding, and HEVC or AVC based multi-view video encoding. The test sequences include balloons, kendo and newspaper (color-corrected) which have a resolution of 1024×768, and four sequences GhostTownFly, PoznanHall2, PoznanStreet and UndoDancer which have a resolution of 1920×1088.

The test result of the application example of the present invention is shown in Table 1 as follows. It can be seen that the solution proposed in the application example of the present invention can reduce the code rates of the "synthetic viewpoint" and the "encoding viewpoint and synthetic viewpoint" by −0.3%, respectively. Since the method proposed in the application example of the present invention does not change the encoding method of the texture image, the encoding efficiency of the texture image is not changed.

A person skilled in the art may realize those functions using various methods for each specific application, but the realization shall not be deemed as going beyond the protection scope of the embodiments of the present invention.

The various illustrative logical blocks or units described in the embodiments of the present invention may implement or operate the described functions through a design of a general processor, a digital signal processor, an application-specific integrated circuit (ASIC), a field-programmable gate array (FPGA) or other programmable logic device, discrete gate or transistor logic, discrete hardware component, or any combination thereof. The general processor may be a microprocessor, and optionally may be any conventional processor, controller, microcontroller or state machine. The processor may also be implemented through a combination of the calculation devices, such as a digital signal processor and a microprocessor, a plurality of microprocessors, one or more microprocessors in conjunction with one digital signal processor core, or any other similar configuration.

The steps of the method or algorithm described in the embodiments of the present invention may be directly

TABLE 1

Test Result

| | Encoding viewpoint 0 | Encoding viewpoint 1 | Encoding viewpoint 2 | Encoding viewpoint | Synthetic viewpoint | Encoding viewpoint and synthetic viewpoint |
|---|---|---|---|---|---|---|
| Balloons | 0.00% | 0.00% | 0.00% | 0.00% | −0.1% | −0.2% |
| Kendo | 0.00% | 0.00% | 0.00% | 0.00% | −0.2% | −0.2% |
| Newspapercc (color-corrected Newpaper) | 0.00% | 0.00% | 0.00% | 0.00% | −0.4% | −0.4% |
| GhostTownFly | 0.00% | 0.00% | 0.00% | 0.00% | −1.3% | −1.0% |
| PoznanHall2 | 0.00% | 0.00% | 0.00% | 0.00% | −0.1% | −0.1% |
| PoznanStreet | 0.00% | 0.00% | 0.00% | 0.00% | −0.1% | −0.1% |
| UndoDancer | 0.00% | 0.00% | 0.00% | 0.00% | −0.2% | −0.2% |
| 1024 × 768 (balloons, kendo, and newspapercc are sequences having a resolution of 1024 × 768, herein an average value of the three sequences is given) | 0.00% | 0.00% | 0.00% | 0.00% | −0.2% | −0.2% |
| 1920 × 1088 (GhostTownFly, PoznanHall2, PoznanStreet, and UndoDancer are sequences having a resolution of 1920 × 1088, herein an average value of the four sequences is given) | 0.00% | 0.00% | 0.00% | 0.00% | −0.4% | −0.4% |
| Average value (of all the sequences) | 0.00% | 0.00% | 0.00% | 0.00% | −0.3% | −0.3% |

A person skilled in the art can also acquire that various illustrative logical blocks, units and steps listed in the embodiments of the present invention can be implemented through electronic hardware, computer software or a combination thereof. In order to clearly exhibit the interchangeability of hardware and software, the functions of the above various illustrative components, units and steps have been generally described. Those functions may be realized through hardware or software, depending on the specific application and the design requirement of the whole system.

embedded into hardware, a software module executed by the processor, or a combination thereof. The software module may be stored in an RAM memory, a flash memory, an ROM memory, an EPROM memory, an EEPROM memory, a register, a hard disc, a removable disc, a CD-ROM or any other form of storage medium in the art. The storage medium may be exemplarily connected to the processor, so that the processor can read information from the storage medium and write information thereto. Optionally, the storage medium may also be integrated into the processor. The processor and the storage medium may be provided in the ASIC, and the ASIC may be provided in the user terminal. Optionally, the processor and the storage medium may also be provided in different components of the user terminal.

In one or more exemplary designs, the above functions described by the embodiments of the present invention may be implemented by hardware, software, firmware or combinations thereof. When being implemented in software, those functions may be stored in the computer readable medium, or transmitted to the computer readable medium in the form of one or more instructions or codes. The computer readable medium includes the computer storage medium and the communication medium which facilitates the transfer of a computer program from one place to other place. The storage medium may be an available medium accessible to any general or special computer. For example, such a computer readable medium may be, but not limited to, RAM, ROM, EEPROM, CD-ROM or other optical disc storage, magnetic disc storage or other magnetic storage device, or any other medium which may bear or store program codes in the form of instruction or data structure and other form readable to a general or special computer, or a general or special processor. In addition, any connection may be appropriately defined as a computer readable medium. For example, if software is transmitted from a web site, a server or other remote resource through a coaxial cable, an optical fiber cable, a twisted pair or a digital subscriber line (DSL), or in a wireless mode such as infrared, radio or microwave, it is also included in the defined computer readable medium. The disk and disc include compressed disc, laser disc, optical disc, DVD, floppy and blue-ray disc. The disk generally replicates data through magnetism, while the disc generally optically replicates data through laser. The combination of the above may also be included in the computer readable medium.

The objects, technical solutions and beneficial effects of the present invention are further described in detail through the above specific embodiments. It shall be appreciated that those descriptions are just specific embodiments of the present invention, rather than limitations to the protection scope of the present invention. Any modification, equivalent replacement, improvement, etc. made within the spirit and principle of the present invention shall fall within the protection scope of the present invention.

What is claimed is:

1. An intraframe encoding method for depth images, applied to 3D video encoding or multi-view video encoding, comprising:
   in an intraframe encoding mode for depth images, generating a non-all-zero residual and an all-zero residual when a prediction unit is encoded; and
   performing a rate-distortion optimization selection between the non-all-zero residual and the all-zero residual, as a residual encoding scheme of the prediction unit.

2. The intraframe encoding method for depth images according to claim 1, wherein the step of performing the rate-distortion optimization selection between the non-all-zero residual and the all-zero residual, as the residual encoding scheme of the prediction unit comprises:
   acquiring a rate-distortion cost corresponding to the non-all-zero residual and a rate-distortion cost corresponding to the all-zero residual, respectively; and
   selecting one of the non-all-zero residual and the all-zero residual which corresponds to a minimum rate-distortion cost and adopting a residual encoding scheme corresponding to the selected residual as the residual encoding scheme of the prediction unit.

3. The intraframe encoding method for depth images according to claim 2, wherein the step of acquiring the rate-distortion cost corresponding to the non-all-zero residual and the rate-distortion cost corresponding to the all-zero residual, respectively, comprises:
   calculating a distortion and a code rate corresponding to the non-all-zero residual, and then calculating the rate-distortion cost corresponding to the non-all-zero residual; and
   calculating a distortion and a code rate corresponding to the all-zero residual, and then calculating the rate-distortion cost corresponding to the all-zero residual.

4. The intraframe encoding method for depth images according to claim 3, wherein
   the step of calculating the distortion and the code rate corresponding to the non-all-zero residual comprises: calculating the distortion and the code rate corresponding to the non-all-zero residual by performing transformation, quantization, entropy encoding, inverse quantization, and inverse transformation on the non-all-zero residual; and
   the step of calculating the distortion and the code rate corresponding to the all-zero residual comprises: calculating the distortion and the code rate corresponding to the all-zero residual by performing entropy encoding on the all-zero residual.

5. The intraframe encoding method for depth images according to claim 1, wherein the step of in the intraframe encoding mode for depth images, generating the non-all-zero residual and the all-zero residual when the prediction unit is encoded comprises:
   in the intraframe encoding mode for depth images, generating the non-all-zero residual when the prediction unit is encoded, and
   generating the all-zero residual by directly zero-setting a residual in the non-all-zero residual.

6. An intraframe encoding device for depth images, applied to 3D video encoding or multi-view video encoding, comprising:
   a residual generation unit configured to generate, in an intraframe encoding mode for depth images, a non-all-zero residual and an all-zero residual when a prediction unit is encoded; and
   a rate-distortion optimization selection unit configured to perform a rate-distortion optimization selection between the non-all-zero residual and the all-zero residual, as a residual encoding scheme of the prediction unit.

7. The intraframe encoding device for depth images according to claim 6, wherein the rate-distortion optimization selection unit comprises:
   a rate-distortion cost acquisition module configured to acquire a rate-distortion cost corresponding to the non-all-zero residual and a rate-distortion cost corresponding to the all-zero residual, respectively; and
   a rate-distortion optimization selection module configured to select one of the non-all-zero residual and the all-zero residual which corresponds to a minimum rate-distortion cost and adopt a residual encoding scheme corresponding to the selected residual as the residual encoding scheme of the prediction unit.

8. The intraframe encoding device for depth images according to claim 7, wherein the rate-distortion cost acquisition module comprises:

a first calculation module configured to calculate a distortion and a code rate corresponding to the non-all-zero residual, and then calculate the rate-distortion cost corresponding to the non-all-zero residual; and a second calculation module configured to calculate a distortion and a code rate corresponding to the all-zero residual, and then calculate the rate-distortion cost corresponding to the all-zero residual.

9. The intraframe encoding device for depth images according to claim 8, wherein the first calculation module is further configured to calculate the distortion and the code rate corresponding to the non-all-zero residual by performing transformation, quantization, entropy encoding, inverse quantization, and inverse transformation on the non-all-zero residual; and the second calculation module is further configured to calculate the distortion and the code rate corresponding to the all-zero residual by performing entropy encoding on the all-zero residual.

10. The intraframe encoding device for depth images according to claim 6, wherein, the residual generation unit is further configured to generate, in the intraframe encoding mode for depth images, the non-all-zero residual when the prediction unit is encoded; and generate the all-zero residual by directly zero-setting a residual of the non-all-zero residual.

11. An encoder, applied to 3D video encoding or multi-view video encoding, comprising:

a residual generation unit configured to generate, in an intraframe encoding mode for depth images, a non-all-zero residual and an all-zero residual when a prediction unit is encoded; and a rate-distortion optimization selection unit configured to perform a rate-distortion optimization selection between the non-all-zero residual and the all-zero residual, as a residual encoding scheme of the prediction unit.

* * * * *